(12) United States Patent
Mitchell et al.

(10) Patent No.: US 7,228,656 B2
(45) Date of Patent: Jun. 12, 2007

(54) FISHING LURE DEVICE AND ASSOCIATED METHOD OF MANUFACTURE

(75) Inventors: Gregory J. Mitchell, Norwich, CT (US); Ernest A. Coleman, Stamford, CT (US)

(73) Assignee: Rellis Group, Inc., Norwich, CT (US)

( * ) Notice: Subject to any disclaimer, the term of this patent is extended or adjusted under 35 U.S.C. 154(b) by 28 days.

(21) Appl. No.: 11/027,377

(22) Filed: Dec. 31, 2004

(65) Prior Publication Data

US 2006/0143971 A1    Jul. 6, 2006

(51) Int. Cl.
*A01K 85/00* (2006.01)
(52) U.S. Cl. .................................... 43/42.06
(58) Field of Classification Search ............... 43/42.06; 426/1; D22/125
See application file for complete search history.

(56) References Cited

U.S. PATENT DOCUMENTS

| 1,393,617 | A |   | 10/1921 | Frame |  |
| 2,797,519 | A |   | 7/1957  | Keller ........................ 43/42.06 |
| 4,047,317 | A | * | 9/1977  | Pfister ........................ 43/42.06 |
| 4,321,117 | A | * | 3/1982  | Kaetsu et al. .................. 521/28 |
| 4,731,247 | A |   | 3/1988  | Wolford et al. ................. 426/1 |
| 4,962,609 | A | * | 10/1990 | Walker ....................... 43/42.06 |
| 6,488,924 | B1 | * | 12/2002 | Monteleone et al. ...... 424/78.1 |

\* cited by examiner

*Primary Examiner*—Johann Richter
*Assistant Examiner*—Ali Soroush
(74) *Attorney, Agent, or Firm*—McCarter & English, LLP

(57) ABSTRACT

A fishing lure assembly and the method of making a unique fill composition that causes attractant scent compounds to be dispensed from the fishing lure assembly. The fishing lure assembly has a body that can retain a volume of fill composition. The fill composition contains an ion exchange material and attractant scent compounds that are ionically bonded together. When the fishing lure is submersed in water, the fill composition is exposed to a controlled flow of water. In an ion exchange reaction, ions contained within the water bond to the ion exchange material and thus free the previously bonded attractant scent compounds. The freed attractant scent compounds flow out of the lure assembly with the passing water.

20 Claims, 3 Drawing Sheets

FISHING LURE DEVICE AND ASSOCIATED METHOD OF MANUFACTURE

BACKGROUND OF THE INVENTION

1. Field of the Invention

In general, the present invention relates to fishing lures. More particularly, the present invention relates to fishing lures that release fish attracting compounds when submersed in water.

2. Background Art

The activity of fishing with a baited line predates recorded history. In this vast period of time, inventive fishermen have developed countless baits and lures. In the past several decades, the popularity of recreational sport fishing has grown dramatically. In light of this popularity, fishermen have been inclined to develop new instruments and techniques for finding and catching fish. It is for this reason that the prior art record of patents is replete with thousands of different fishing lure designs.

Many artificial lures are designed with unique shapes and movements that are intended to make the lures attractive to fish. However, many species of fish track their prey either partially or totally based on scent. In fact, some species of fish are so sensitive to scent that they can detect prey miles away and well out of visual range. For example, certain species of shark can detect blood in water in concentrations of only parts per billion.

Most fish species are known to have the ability to detect chemicals in the environment. It has been determined that certain compounds, such as amino acids, specific proteins, lipids, citrates, urea and other compounds, are contained within the tissues, excretions or blood of prey fish. These compounds, either individually or in combination can physiologically stimulate the olfactory and or gustatory receptors when detected by predator fish. These observed changes in certain predator fish include, increased instances of snapping, biting, and swallowing, as well as increased retention time of held bait. Some fish have been observed to swim more aggressively and across wider areas when scent compounds are detected in the water.

It is for these reasons that natural baits have long been used by fishermen in an attempt to present a natural food source to fish. It is also for these reasons that fishermen chum the waters where they are fishing in hopes of attracting predator game fish. Natural baits however, have a number of inherent drawbacks and disadvantages. These shortcomings include rapid bacteriological spoilage, high cost, unpleasant handling, and durability issues resulting in one time only use. Natural bait also smells, and fouls all surfaces it touches. This requires that fishing boats and fishing gear be cleaned repeatedly in order to be kept sanitary. Recognizing the disadvantages of natural bait, the popularity of artificial lures grew.

Although artificial lures solved many of the obvious shortcomings of natural bait, they were not as effective in catching fish. The prior art is replete with many different lure designs that incorporate scent or other perceived methods to attract predator game fish to artificial lures. In the simplest form, such prior art lures use an absorbent material that is soaked with fish oils. Such prior art lures are exemplified by U.S. Pat. No. 1,393,617 to Frame, entitled Artificial Bait; and U.S. Pat. No. 2,797,519 to Keller, entitled Artificial Bait.

A problem associated with absorbent fishing lures is that they have a tendency to release their scent quickly. Thus, after the lure has been in use in the water for a few minutes, all the oils have left the lure and the lure is saturated with only water.

In attempts to prolong the period of time that a lure releases scent, scent compounds have been incorporated within the matrix of various polymers. The reason for this is that the attractants are supposed to leech out from the lure when in the water and attract fish. This approach has several drawbacks, releasing the attractant from the lure to slowly, resulting in the decomposition of the scent, or too rapidly exhausting the attractant from the lure. These lure designs do not allow sufficient means of recharging the attractants to be of any use to the fisherman in attracting fish. These lure designs also do not allow the fisherman to introduce different attractants to the lure to quickly target specific species of fish. Thus, once the scent is exhausted, the lure cannot be refilled with scent and must be discarded. Typical of this design is that the migration of the suspended attractant agents are greatly restricted and are unable to be released in a predictable or sustained manner. Such prior art lures are exemplified by U.S. Pat. No. 4,731,247 to Wolford, entitled Artificial Fish Baits With Sustained Release Properties; and U.S. Pat. No. 4,962,609 to Walker, entitled Fish Attractant Scented Fishing Lure.

Other designs have sought a similar approach of combining scent within the matrix of the lure, but make the mistake of using water insoluble polymers or gums which do not release at a desired rate if at all. Again, these designs trap the scent attractant within their matrices where they break down and decompose, and render the lure ineffective.

It was to overcome the lack of effectiveness and expense of these described prior art devises that the present invention was developed. It can be seen that a need exists in the field of artificial fishing lures, for a lure that slowly releases scent compounds in fresh, salt or brackish water, yet can be repeatedly recharged with the scent compounds once the initial scent compounds have been exhausted. This need is met by the present invention as described and claimed below.

SUMMARY OF THE INVENTION

The present invention relates to devices and methods for the absorbing and releasing of scent compounds known to attract fish, from ion exchange materials. These ion exchange materials may be incorporated within fishing lures and traps, which are intended to be utilized for both recreational and commercial purposes. The present invention includes a fishing lure assembly and the method of using a unique loaded ion exchange fill composition that causes scent to be released from the fishing lure assembly in water. The fishing lure assembly includes a body that can retain a volume of an ion exchange material, that when placed in contact with attractant scent compounds become ionically bonded or sorbed together and create a loaded ion exchange fill composition.

When the fishing lure is submersed in water, the loaded ion fill composition is exposed to a controlled flow of water. In an ion exchange reaction, ions contained within the water temporarily bond to the ion exchange material and thus free the previously bonded attractant scent compounds. The freed attractant scent compounds flow out of the lure assembly with the passing water.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention can be utilized to create many kinds of artificial bait, such as lobster trap bait, net bait and the like, the present invention is particularly well suited for making fishing line casting baits. Accordingly, by way of example, the present invention will be primarily described embodied as a casting lure in order to set forth the best mode contemplated for the invention. However, the embodiment of the present invention as a casting lure should not be considered a limitation of the present invention to other forms of fishing baits.

Figure 1:
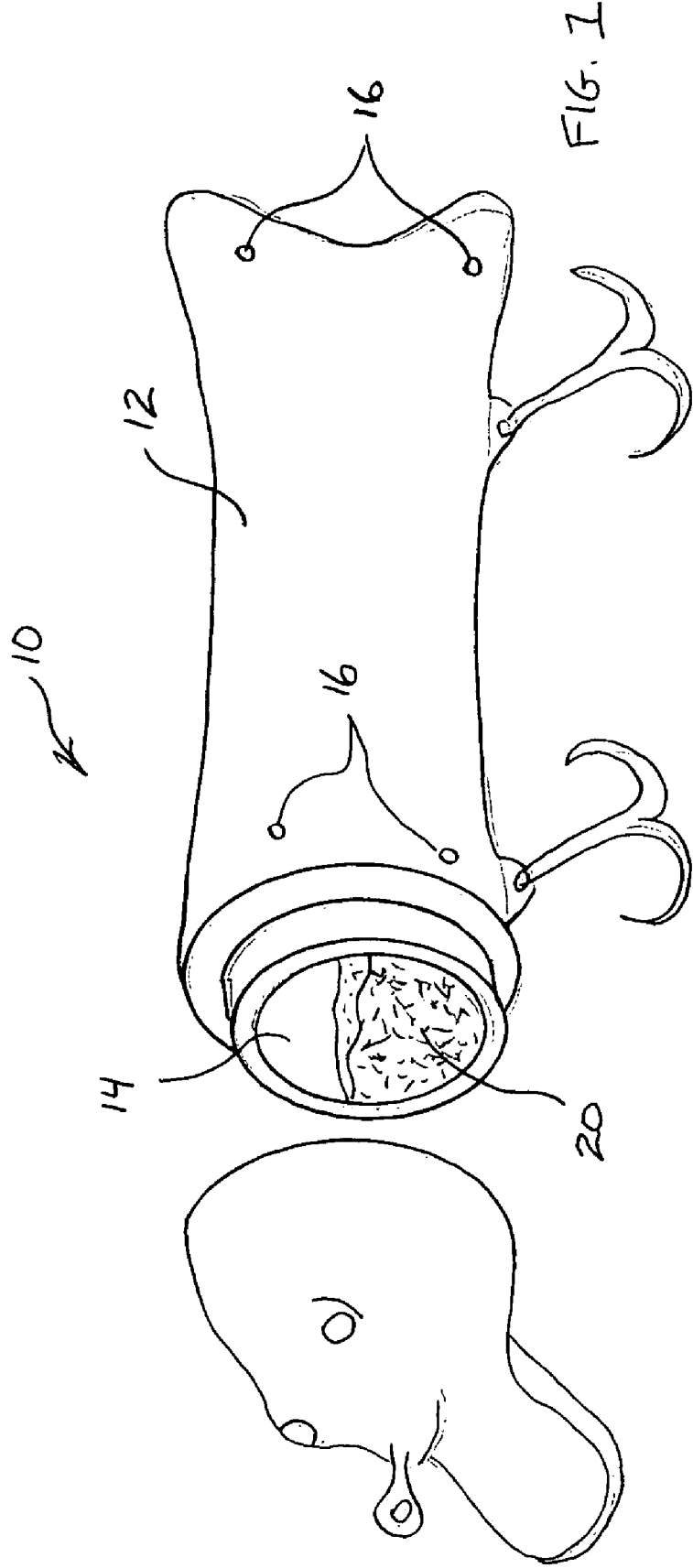
FIG. 1 is a perspective view of an exemplary embodiment of a lure assembly in accordance with the present invention.

Referring to FIG. 1, a fishing lure assembly 10 is shown. The fishing lure assembly 10 has a body 12. In the shown embodiment, the body 12 has a fish shape, however, many other body shapes can be used. The body 12 of the fishing lure assembly 10 can be made from metal, plastic, permeable fabric or an elastomeric material. However, it is preferred that the material of the body 12 itself be impermeable to water.

The body 12 of the fishing lure assembly 10 defines an internal chamber 14. In the shown embodiment, the body 12 of the fishing lure assembly 10 is divided into two sections that can be selectively conjoined or otherwise mated together by a suitable means. When opened, this provides access to the internal chamber 14 so that ion exchange material and/or scent can be introduced to the internal chamber 14.

Small flow holes 16 are formed through the body 12. The flow holes 16 communicate with the internal chamber 14. The diameter and number of flow holes 16 is dependent upon the size of the body 12 and the internal chamber 14. The flow holes 16 allow water to flow into and out of the internal chamber 14 once the lure assembly 10 is submersed in water. The flow holes 16 also allow air to escape from the internal chamber 14 so that the lure assembly 10 will not remain overly buoyant when placed into water. Air trapped within the internal chamber prevents the free transport of attractant scent compounds from exiting the internal chamber 14, through the flow holes 16. Thus, it is important that the flow holes 16 enable all trapped air to leave the internal chamber 16 when it is placed in water.

It is preferred that the flow holes 16 allow between one and fifty milliliters of water to pass into, and out of, the body 12 of the lure assembly 10 per minute as the lure assembly 10 is drawn through the water. Larger lures can have larger flow rates. Smaller lures can have smaller flow rates.

A unique loaded ion exchange fill composition 20 is used to fill the internal chamber 14 of the fishing lure body 12. The loaded ion exchange fill composition 20 contains an ion exchange material (IEM) and an attractant scent compound (ASC) that are ionically bonded. The loaded ion exchange fill composition 20 releases reversibly bonded ionic attractant scent compounds (ASC) into the water that flows through the internal chamber 14 of the fishing lure body 12. As such, the attractant scent compounds (ASC) are released into the water surrounding and trailing the fishing lure assembly 10. Once the fish attractant scent compounds (ASC) are exhausted from the loaded ion exchange fill composition 20, new fish attractant scent compounds may be introduced to the internal chamber 14 that ionically bond and sorbe to the exhausted ion exchange material (IEM). The fishing lure assembly 10 is then quickly ready for reuse.

The loaded ion exchange fill composition 20 that is used to fill the internal chamber 14 of the fishing lure body 12 includes at least one ion exchange material (IEM) and at least one attractant scent compound (ASC). The ion exchange material (IEM) can be any material that is capable of maintaining a positive surface charge, a negative surface charge, or a mixture of both surface charge types. Fish attractant scent compounds (ASC) are then sorbed or bonded to the ion exchange material (IEM). The loaded ion exchange fill composition 20 can be placed within the internal chamber 14 of the fishing lure body 12. When the fishing lure body 12 is submersed in water, water seeps into the internal chamber 14 through the fill holes 16. As water contacts the loaded ion exchange fill composition 20, the ions contained in the water replace the ionized fish attractant scent compounds (ASC) and temporarily bond to the ion exchange material (IEM). As a result, the attractant scent compounds (ASC) are released into the surrounding water from the internal chamber 14, and escape from the fishing lure assembly 10, by means of the flow holes 16.

The ion exchange material that are to be used are granular in composition, having spherical particle shape or some other geometrical shape. The ion exchange materials generally possess a high amount of accessible internal and/or external active sites in order to maximize exposed surface areas that are available for ionic bonding with attractant scent compounds.

A loaded ion exchange fill composition 20 containing ion exchange material (IEM) that is synthetic, is functionalized with specific chemical groups to produce a positively or negatively charged ion exchange material. The ion exchange material is functionalized with a positive charge to produce an anion exchange material, or it is functionalized with a negative charge to produce a cation exchange material. The attractant scent compounds (ASC) are then provided. The attractant scent compounds (ASC) are ionized with a charge opposite that of the ion exchange material (IEM). The ion exchange material (IEM) and the attractant scent compounds (ASC) ionically bond and create the loaded ion exchange fill composition 20.

In Formula 1 below, an exemplary embodiment of a loaded ion fill composition is shown. The loaded ion exchange composition includes a negatively charged ion exchange material $(IEM)^-$ that is ionically bonded to a positively charged attractant scent compound $^+(ASC)$. Since the ion exchange material (IEM) is negatively charged, it is considered a cation ion exchange material.

$(IEM)^-{}^+(ASC)$           Formula 1

For an anion exchange material, the ion exchange material (IEM) would be positively charged. The positively charged ion exchange material $(IEM)^+$ would then ionically bond to attractant scent compounds $^-(ASC)$ that were negatively charged, as indicated by Formula 2.

$(IEM)^+{}^-(ASC)$           Formula 2

It will therefore be understood that the ion exchange material (IEM) can be functionalized with specific chemical groups to produce a positively or negatively charged ion exchange material. The ion exchange material (IEM) is functionalized with a positive charge to produce an anion exchange material, or is functionalized with a negative charge to produce a cation exchange material.

In salt water, there are free salt ions, such as sodium ions ($Na^+$) and chloride ions ($Cl^-$) from the salt that is dissolved in the water. Referring to Formula 3 below a cation release reaction is shown.

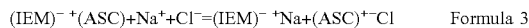

Formula 3

Referring to Formula 4 below an anion release reaction is shown.

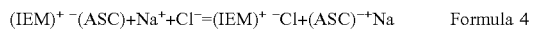

Formula 4

It can be seen from both Formula 3 and Formula 4, that once the loaded ion exchange composition 20 (FIG. 1) is exposed to water, ions in the water temporarily bond to the ion exchange material (IEM) and replace the attractant scent compounds (ASC). This frees the attractant scent compounds (ASC) into the surrounding water. The attractant scent compounds (ASC) then flow out of the lure assembly 10 with the passage of water.

Obviously, the rate at which the attractant scent compounds (ASC) are released into the surrounding water rely upon many variables. These variables include the moles of attractant scent compounds (ASC) present, the number of available functional groups on the ion exchange material, the amount of exposed surface areas of the ion exchange material (IEM), the strength of the ionic bonds between the ion exchange material and the attractant scent compounds, the amount of free ions in the water and the rate of water exposure.

There are many types of ion exchange material (IEM) and sorbents that can be used. Ion exchange materials are generally classified as cationic or anionic materials, that are strong acids, weak acids, strong bases or weak bases. The ion exchanging materials fall into various categories. One category of ion exchange material (IEM) includes natural mineral compounds. Natural mineral compounds include clays (e.g. bentonite, kaolinite, and illite, and montmorillonite); vermiculite and zeolites (e.g. analcite, chabazite, sodalite, clinoptilolite, crystilline alumino-silicates, heulandite, natrolite, phillipsite, stilbite, thomsonite, scolecite, harmotone, sodium aluminate and sodium silicate based ion exchange materials including those categorized as "green sands"); and any/all modification or functionalization of these materials.

Another category of ion exchange material (IEM) includes natural organic ion exchange materials. Natural ion exchange materials include polysaccharides (e.g. algic acid, straw, and peat derivatives); proteins (such as casein, keratin, and collagen); carbonaceous materials (such as activated charcoals, charcoal, lignites, and coals); and any/all modification or functionalization of these materials.

Modified or functionalized natural ion exchangers are various modifications to the natural ion exchange materials by the introduction of phosphate, carbonic, or other acidic functional groups, or thermal treatments. These include inorganic metallic oxides and titanium oxides and any/all modification or functionalization of these materials.

A fourth category of ion exchange materials includes synthetic inorganic ion exchange materials. Synthetic inorganic ion exchange materials include encapsulated copper zeolites, chelating zeolites, synthetic zeolites, titanates, silico titanates, and the classes of zeolites that incorporate metal molybdenum atoms that are commonly referred to as "naked pores". Such material can be engineered and functionalized with a wide variety of chemical properties and pore sizes.

A fifth category of ion exchange material (IEM) includes synthetic organic ion exchange materials. Synthetic organic ion exchange materials can be made by introducing ionic groups into resin prior to polymerization, thereby making the ionic group an integral part of the monomer. Alternatively, synthetic organic ion exchange materials can be made by introducing the ionic group into the polymer after polymerization. Synthetic organic ion exchange materials include styrene based ion exchange materials containing aromatic hydrocarbons, polystyrene cross linked by divinylbenzene materials, phenolformaldehyde condensation materials, phenolsulphonic acid resin ion exchange materials, resorcinol-formaldehyde polycondensate materials, acrylic based ion exchange materials, acrylic straight chain hydrocarbon based ion exchange materials, polyacrylic or polymethacrylic acid cross linked with divinylbenzene, or any poly-functional monomer based material. This includes all gel type resins, and all macroreticular ion exchange resins and all modifications thereof.

Synthetic organic ion exchange materials, in the form of ion exchange resins, are a special type of polyelectrolyte because they are a cross-linked polyelectrolyte. Their properties are determined by the nature and the number of mobile and fixed charges and by the cross-linking bonds. Ion exchange resins include carboxylic types that are made by the reaction of phenol, acrolein, oxamic acid, or resorcylic acid with formaldehyde. Such ion exchange resins can also be made by the formation of carboxylic divinyl benzene copolymers or by the copolymerization of methacrylic acid with divinyl benzene and of maleic anhydride with styrene and divinyl benzene.

Other ion exchange resins include, sulfonated ion exchange resins, phosphonic acid ion exchange resins, anionic ion exchange resin amines, resins which include quaternary ammonium groups, aminated resins based upon styrene, polymers based upon hydroquinone and any prepared matrix functionalized by successive chloromethylation and quaternization.

A sixth category of ion exchange material (IEM) includes composite ion exchange materials. Composite ion exchange materials are one or more ion exchangers combined with another material [organic or inorganic] which may itself be an ion exchange material. Examples of composite ion exchange material would be coating cupric ferric hexacyanoferrate on polyacrylic fibers and modifications or functionalizations thereof.

A seventh category of ion exchange material (IEM) would be ion exchange membranes. Ion exchange membranes include heterogeneous and homogeneous representations prepared by dispensing colloidal or finely ground ion exchange materials throughout an inert thermoplastic binder like polyethylene, polystyrene, or synthetic rubber. This is followed by compression, rolling, and/or extrusion, forming disks, films, or ribbons.

Other ion exchange materials include appropriate polyamides (NYLONS), functionalized silica, functionalized silica gel, all functionalized agaroses, including all highly cross-linked agaroses, powdered fire brick, alumina, and other material that can be functionalized to become an ion exchange material. However, in the preferred embodiment of the present invention, a commercial ion exchange resin is used as the ion exchange material. Ion exchange resins are typically manufactured as powders, small spheres, granules, and may also be in the form of geometric solids. There are several types of ion exchange resins currently being produced.

The term "attractant scent compound", as used herein, refers to various compounds found in natural fish that attract and/or have a positive physiological effect on predatory fish. Such attractant scent compounds (ASC) include, but are not limited to, amino acids, appropriate proteins, citrates and ionic compounds.

In the embodiment of FIG. 1, the rate of water exposure is regulated by the presence of flow holes 16 in the body 12 of the lure assembly 10, or by a porous body structure. Due to the small size of the flow holes 16, it is possible that the flow holes 16 can be clogged by debris. This is especially true if the lure assembly 10 is being pulled through murky or algae ridden waters. Thus, the flow holes 16 may be optionally covered with particle screens 17.

Figure 2:
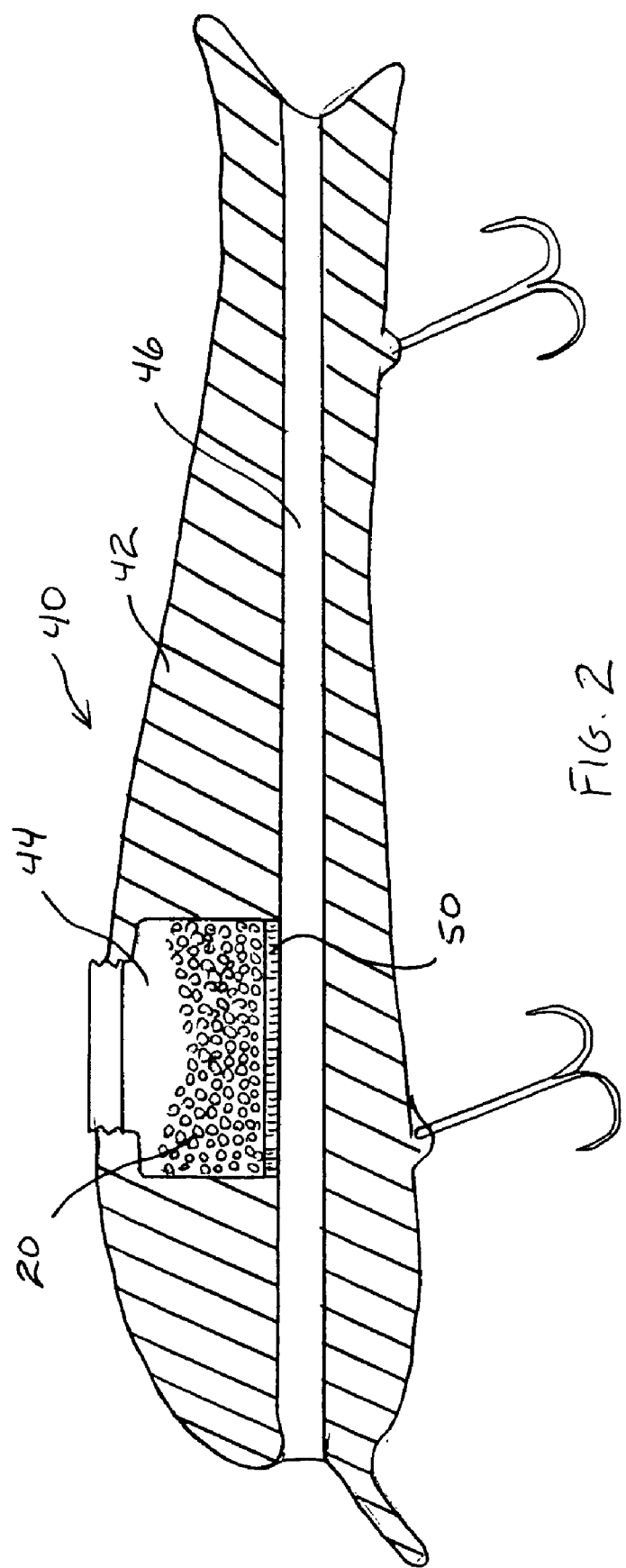
FIG. 2 is a cross-sectional view of a second embodiment of a fishing lure.

Referring now to FIG. 2, an alternate embodiment of the present invention lure assembly 40 is shown. In this embodiment, a lure body 42 is provided that defines an internal chamber 44. However, a larger conduit 46 is provided that cannot be easily fouled with debris. The larger conduit 46 enables a much higher volume of water to flow through the lure assembly 40. To limit the ion exchange between the passing water and the lures loaded ion exchange fill composition 20, a particle screen 50 is provided. The lures loaded ion exchange fill composition 20 is enclosed behind the particle screen 50. The particle screen 50 is preferably a segment of permeable woven mesh material. However, other permeable material(s) can be used.

Water flows through openings 46, of the body 42, of the lure assembly 40. Some of the water passes through the particle screen 50 and reacts with the lures loaded ion exchange fill composition 20. The attractant scent compounds (ASC) are released from the lures loaded ion exchange fill composition 20 in the manner previously described. Once the attractant scent compounds (ASC) are released, those scent compounds must also pass through the particle screen 50 before they can flow out of the lure assembly 40. Thus, by providing the particle screen 50, the flow of water into and out of the lures loaded ion exchange fill composition 20 can be controlled.

There exist particle screens 50 of various permeability rates. A particle screen 50 can therefore be provided that presents the proper flow characteristics for the size of the lure assembly 40 and the lures loaded ion exchange fill composition 20 being used.

Figure 3:
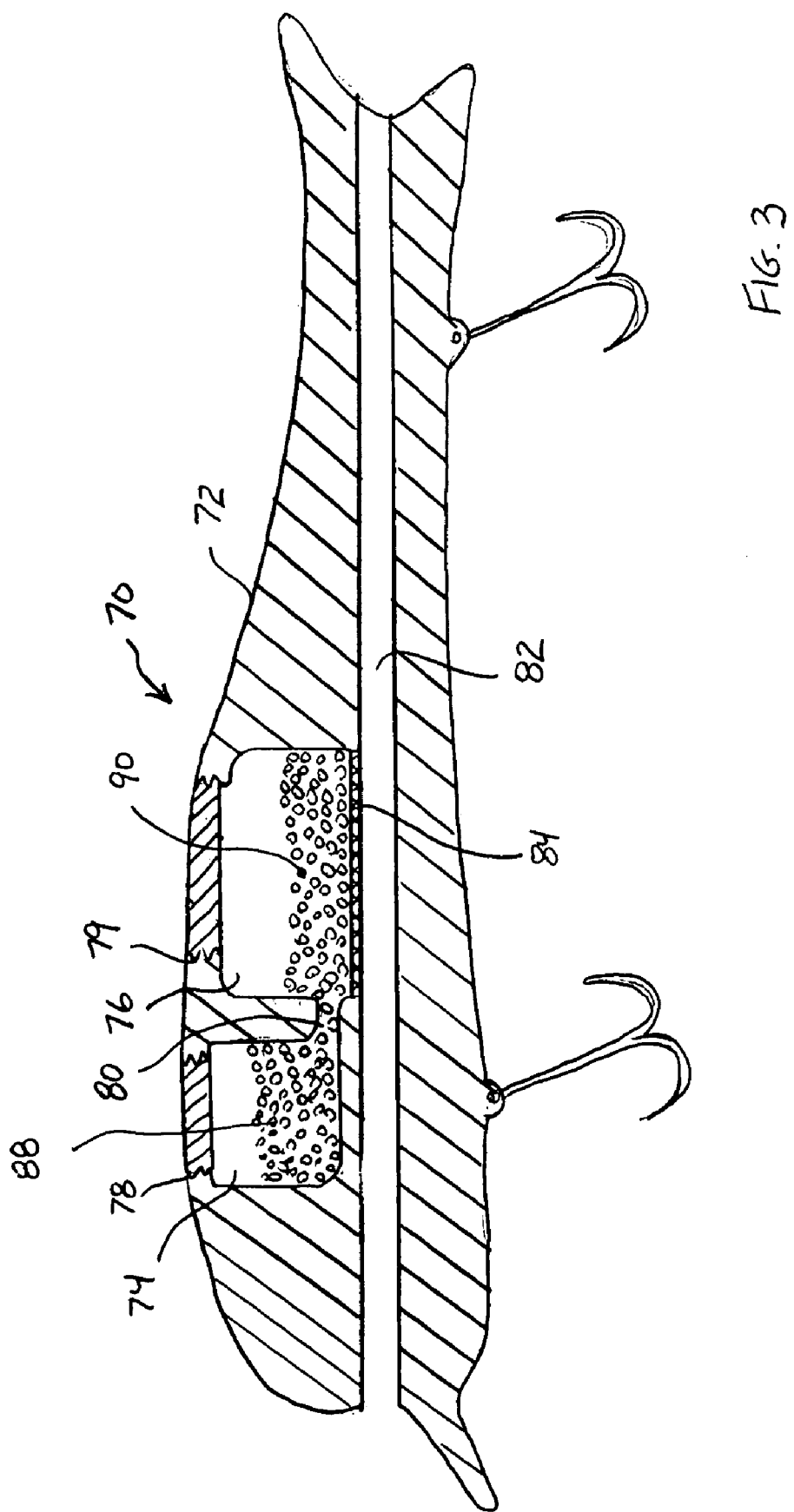
FIG. 3 is a cross-sectional view of a third embodiment of a fishing lure.

Referring now to FIG. 3, another embodiment of a fishing lure 70 is shown. In this embodiment, a lure body 72 is provided that defines two internal chambers 74, 76. Each of the chambers 74, 76 has its own access opening 78, 79. The two chambers 74, 78 interconnect via a restricted conduit 80. Thus, water can flow between the chambers 74, 76 in restricted amounts.

A larger conduit 82 is provided that passes through the lure body from front to back. The larger conduit 82 enables a much higher volume of water to flow through the lure assembly 70. The large conduit 82, however, only communicates directly with one of the chambers 76. A screen 84 separates the chamber 76 from the large conduit 82 to restrict the flow of water and the resulting ion exchange reaction.

Different categories of ion exchange materials are placed into the two chambers 74, 76 within the lure. For example, a natural inorganic ion exchange material 88 can be placed in the first chamber 74 and a synthetic organic ion exchange material 90 can be placed in the second chamber 76. This brings a unique storage capacity of attractant to the fishing lure 70. The aforementioned configuration would afford the user extended and varied release rates of attractant scent compounds (ASC) from the lure body 72 due to the slightly different release rates from differing ion exchange materials 88, 90. Attractant scent compounds (ASC) can be introduced to the natural inorganic ion exchange material 88, where the attractant scent compounds (ASC) would load the natural inorganic ion exchange material 88 creating a loaded ion exchange fill composition. When placed into fresh, salt, or brackish water, the attractant scent compounds (ASC) would be released from the loaded natural inorganic ion exchange material 88. Although some of the attractant scent compounds would escape from the lure in this step, the remaining attractant scent compound within the lure would contact and load the adjoining synthetic organic ion exchange material 90, as the lure body 72 is drawn through the water. The attractant scent (ASC) compounds would be released out of the lure body 72 in the manner previously described.

It will be understood that the embodiments of the present invention that are illustrated and described are merely exemplary and that a person skilled in the art can make variations to the shown designs. For example, the shape of the lure assembly can be modified into any known lure shape. The body of the lure may be made rigid or flexible depending on desired materials. The body of the lure assembly need not be openable. Thus, the lure's loaded ion exchange fill composition would not be refillable but would instead be rechargeable when fish attractant scent compounds are introduced. Furthermore, there are many ways to position the loaded ion exchange fill composition within or around a lure body so that the loaded ion exchange fill composition is exposed to a controlled volume of passing water. The loaded ion exchange fill composition could also comprise any mixture from the previously described categories of ion exchange materials. All such variations, modifications and alternate embodiments are intended to be included within the scope of the present invention as defined by the claims.

What is claimed is:

1. A fishing lure assembly comprising:
    a first volume of ion exchange material;
    a second volume of at least one ionic attractant scent compound ionically bonded to said ion exchange material, therein forming a loaded ion exchange fill composition; and
    a lure body for retaining said loaded ion exchange fill composition, wherein said ion exchange material can be reloaded and reused.

2. The assembly according to claim 1, wherein said lure body retains said loaded ion exchange fill composition and exposes said loaded ion exchange fill composition to water when said lure body is submersed in water.

3. A method of releasing scent compounds from a fishing lure, said method comprising the steps of:
    providing a fishing lure, wherein said lure comprises a lure body;
    providing a volume of an ion exchange material;
    providing a volume of at least one ionic scent compound ionically bonded to said ion exchange material, therein forming a loaded ion exchange fill composition;
    combining said ion exchange material and said scent compound to create a composition, wherein said composition is disposed within said lure body; and
    placing said lure in water, wherein said water contacts said composition and results in release of said scent compounds from said fishing lure.

4. The method according to claim 3, wherein the ionic scent compound includes a volume of material that has a physiological effect on predator fish.

5. The method according to claim 3, wherein said step of combining said ion exchange material and said scent compound includes creating ionic bonds between said ion exchange material and said scent compound.

6. A method of releasing scent compounds from a fishing lure, said method comprising the steps of:
providing a fishing lure, wherein said lure comprises a lure body and a flow hole therethrough;
providing a volume of an ion exchange material;
providing a volume of at least one ionic scent compound ionically bonded to said ion exchange material, therein forming a loaded ion exchange fill composition;
combining said ion exchange material and said scent compound to create a composition, wherein said composition is disposed within said lure body, and wherein said flow hole is in fluid communication with said composition; and
placing said lure in water, wherein said water contacts said composition through said flow hole and results in release of said scent compounds from said lure.

7. The composition according to claim 1, wherein said ion exchange material is a natural mineral compound.

8. The composition according to claim 7, wherein said natural mineral compound is selected from a group consisting of clays, vermiculite and zeolites.

9. The composition according to claim 1, wherein said ion exchange material is a natural organic ion exchange material.

10. The composition according to claim 9, wherein said natural organic ion exchange material is selected from a group consisting of polysaccharides, proteins and carbonaceous materials.

11. The composition according to claim 10, wherein said natural organic exchange material is functionalized by the introduction of chemical groups selected from phosphate, carbonic acid, inorganic metallic oxides and titanium oxides.

12. The composition according to claim 1, wherein said ion exchange material is a synthetic inorganic ion exchange material.

13. The composition according to claim 12, wherein said synthetic inorganic ion exchange material is selected from a group consisting of encapsulated copper zeolites, chelating zeolites, synthetic zeolites, titanates, silico titanates, and zeolites that incorporate molybdenum atoms.

14. The composition according to claim 1, wherein said ion exchange material is a synthetic organic ion exchange material.

15. The composition according to claim 14, wherein said synthetic organic ion exchange material is selected from groups consisting of ion exchange resins that are synthesized from, styrene based ion exchange materials containing aromatic hydrocarbonans, polystyrene cross linked by divinylbenzene resin materials, phenolformaldehyde condensation products, phenolsulphonic acid resin ion exchange material, resorcinol-formaldehyde polycondensate based ion exchange material, acrylic based ion exchange material, acrylic straight chain hydrocarbons, polyacrylic or polymethacrylic acid cross linked with divinylbenzene, strong and weak gel resins, poly-functional monomers and macroreticular ion exchange resins, carboxylic type ion exchange resins, carboxylic divinylbenzene copolymer resins, phenol, acrolein, oxarnic acid, resorcylic acid based carboxylic resins, copolymerized methacrylic acid and divinylbenzene resins, maleic anhydride and styrene and divinylbenzene based resins, sulfonated ion exchange resins, phosphonic acid ion exchange resins, anionic ion exchange resin amines, ion exchange resins containing quaternary amonium groups, aminated resins based upon styrene, ion exchange polymers based on hydroquinone, and prepared matrixes functionalized by successive chloromethylation and quaternization.

16. The composition according to claim 1, wherein said ion exchange material is a composite ion exchange material where at least one ion exchange material coats another material.

17. The composition according to claim 1, wherein said ion exchange material is an ion exchange membrane.

18. The composition according to claim 17, wherein said ion exchange membrane is contains ion exchange materials dispersed throughout an inert thermoplastic binder.

19. The composition according to claim 1, wherein said ion exchange material is selected from a group consisting of appropriate polyamides, functionalized silica, agarose, functionalized silica gel, highly cross-linked agaroses, powdered fire brick, and alumina.

20. The composition according to claim 1, wherein said attractant scent compound is selected from a group consisting of appropriate proteins, amino acids, citrates and ionic materials.

* * * * *